Feb. 15, 1966   A. M. BARRETT, JR   3,235,024
AUTOMATIC PILOT FOR VEHICLES
Filed April 25, 1963   2 Sheets-Sheet 1
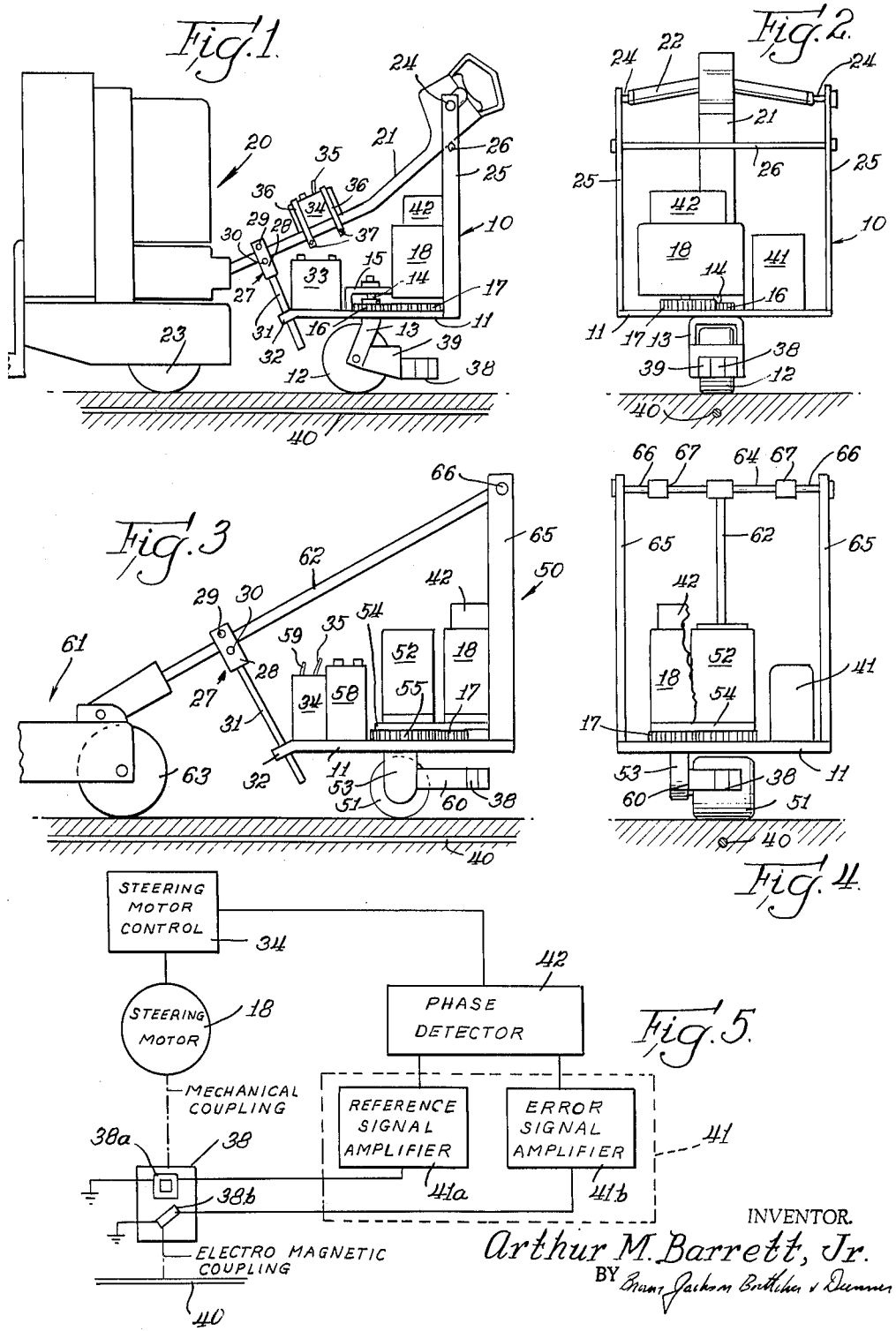
INVENTOR.
Arthur M. Barrett, Jr.

Feb. 15, 1966   A. M. BARRETT, JR   3,235,024
AUTOMATIC PILOT FOR VEHICLES
Filed April 25, 1963
2 Sheets-Sheet 2
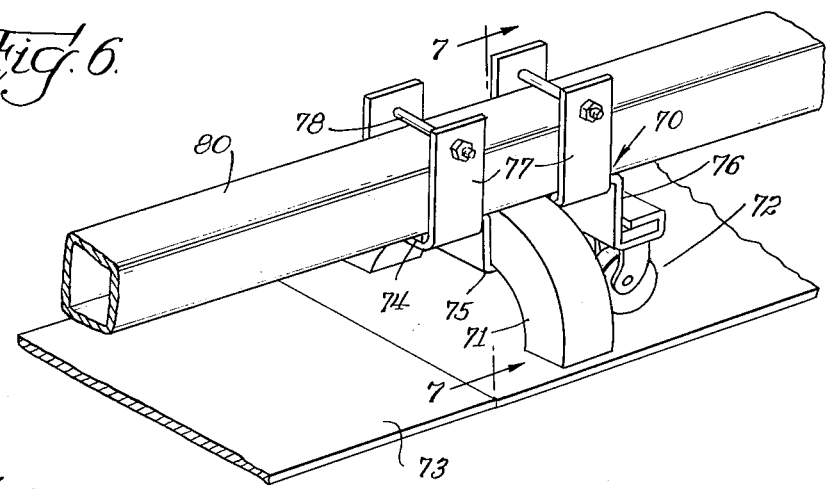
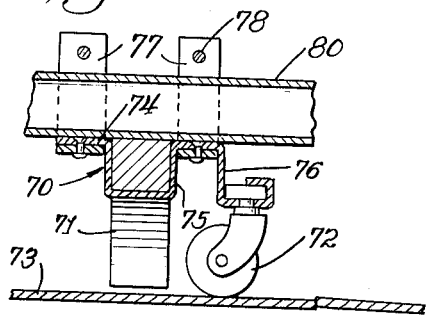
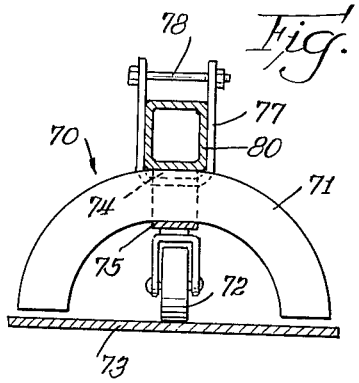
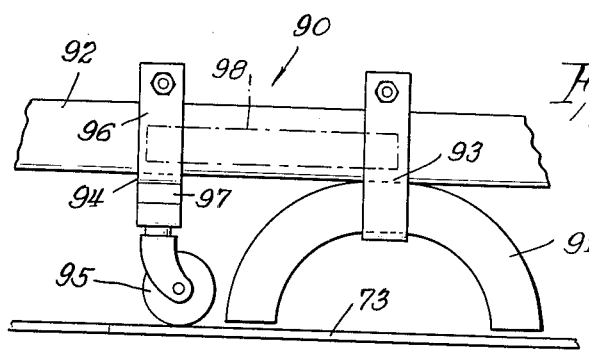
INVENTOR.
Arthur M. Barrett, Jr.
BY
Atty's.

United States Patent Office 3,235,024
Patented Feb. 15, 1966

3,235,024
AUTOMATIC PILOT FOR VEHICLES
Arthur M. Barrett, Jr., Northbrook, Ill., assignor to Barrett Electronics Corporation, Northbrook, Ill., a corporation of Illinois
Filed Apr. 25, 1963, Ser. No. 275,634
9 Claims. (Cl. 180—79.1)

The present invention relates to an automatic pilot for steering vehicles along a predetermined path, and more particularly to a mobile pilot unit for use in an automatic guidance system to steer vehicles not equipped to be guided or used in such a system.

In one well-known type of automatic guidance system for wheeled vehicles, signal-emitting guidance means are employed to define a predetermined path or course, and vehicles are provided with means for sensing the signal and steering the vehicles along the course. From the standpoint of economy, it is advantageous to operate a guidance system with a minimum number of vehicles designed for use therein. In the event of the capacity of the system falling below requirements, as by withdrawal from service of one or more of the vehicles or an increase in volume of traffic to be handled by the system, the system may become inadequate or inefficient. The pilot unit of this invention provides a solution for this difficulty in that it may be applied to vehicles not equipped with the requisite signal-responsive or path-sensing means for use in the guidance system, to render such vehicles capable of use in the system without requiring any change in or reconstruction of such vehicles. The pilot unit of the invention thus provides for great flexibility in automatic guidance systems by allowing ready adaptation thereof to varying demands, and also allows operation of such systems in normal manner in the event of emergencies. At the same time, since the pilot unit is relatively low in cost, and vehicles not equipped for use in guidance systems are less expensive than vehicles so equipped, the invention provides the further advantage of involving expenditures considerably lower than would otherwise be necessary to obtain the same results. It will be obvious, of course, that all of the vehicles employed in the guidance system may be of the type not equipped originally for use therein, adapted for such use by the pilot units of the present invention. The invention is not limited to guidance systems of the type mentioned, employing signal-emitting guidance means such as a conductor, since the pilot unit may employ means responsive to other course-defining means than a signal-emitting conductor, and accomplish the desired steering of the vehicle along the course. A magnetic guidance system may be provided in which magnet means are employed on the pilot unit to follow means of magnetic material defining the course or path to be followed by the vehicle.

It is accordingly an important object of the present invention to provide a mobile pilot unit constructed to respond to the means defining a predetermined course of a vehicle guidance system and securable to a steerable vehicle not equipped for use in the guidance system, to pilot or steer such vehicle along said course.

It is another object to provide a mobile pilot unit constructed to follow path-defining means in a vehicle guidance system and connectible to a steerable vehicle not equipped for use in the system, to steer the vehicle along the defined path.

Another object is the provision of a mobile pilot or steering unit for attachment to a vehicle not originally adapted for use in a vehicle guidance system to adapt such vehicle to use in the system, without requiring any change or modification in the vehicle.

Another object is the provision of a mobile pilot or steering unit adapted for following course-defining means in a vehicle guidance system, which is attachable to a self-powered steerable vehicle not initially adapted for use in the system, to guide the vehicle along said path, with the vehicle serving to drive the unit along the path.

Another object is the provision of a mobile pilot or steering unit adapted to follow path-defining means in a vehicle guidance system connectible to a non-powered vehicle initially not adapted for use in the system, for guiding the vehicle along the path and having driving means for effecting movement of the vehicle therewith along said path.

It is a further object of the invention to provide a mobile pilot or steering unit employing only a single wheel and attachable to a steerable vehicle not initially equipped for use in a vehicle guidance system, to adapt the vehicle for operation in the system, the unit including means for following a predetermined path in the guidance system to steer the vehicle along said path, and the vehicle cooperating with the unit to maintain the same stable and in upright position.

It is also an object to provide a novel magnetic guidance system employing means of magnetic material to define the path or course for a vehicle, and magnet means to follow the defined course and the vehicle therealong.

Other and further objects, advantages, and features of the invention will be apparent to those skilled in the art from the following detailed description, taken in conjunction with the accompanying drawings, in which:

FIG. 1 is a side elevational view of a pilot unit according to the invention attached to a steering handle of a powered wheeled vehicle;

FIG. 2 is a front elevational view of the unit as shown in FIG. 1;

FIG. 3 is a side elevational view similar to FIG. 1, but showing a somewhat modified form of pilot unit for use with a non-powered vehicle;

FIG. 4 is an enlarged fragmentary front elevational view of the unit of FIG. 3;

FIG. 5 is a diagram of a control circuit for the pilot unit;

FIG. 6 is a perspective view of another embodiment of the invention;

FIG. 7 is a cross-sectional view taken substantially as indicated by the line 7—7 in FIG. 6;

FIG. 8 is a side elevation, partly in section, of the pilot unit shown in FIG. 6; and FIG. 9 is a perspective view of a somewhat modified form of the embodiment of FIG. 6.

Referring first to FIGS. 1 and 2 of the drawings, there is shown a mobile pilot unit generally designated 10, comprising a base or platform 11 supported on a single caster wheel 12 disposed centrally thereof. The wheel is journaled in a swivel yoke 13 having a swivel shaft portion 14 projecting upwardly through the platform 11 and journaled by suitable bearings, not shown, in the platform 11 and a portion of a hat section support member 15 secured on the platform, to rotate about an axis perpendicular to the platform. On the swivel shaft portion 14 is secured a gear 16 which meshes with a driving pinion 17 forming part of reduction gearing driven by a reversible electric steering motor 18 suitably mounted on the pilot unit 10.

It will be evident that upon energization of the motor 18 to turn in either direction, the driving pinion 17 will turn the gear 16 about the swivel axis so as to rotate the swivel yoke 13 and therewith the wheel 12 to change the heading or direction of travel thereof. The platform 11 and the remainder of the pilot unit 10 of course move in the same direction as the wheel 12, the direction of travel of the unit thus being determined by the directional turning or steering of the wheel by the mechanism disclosed.

The vehicle illustrated as steered by the unit 10 is a self-driven or powered industrial truck 20 of a well-known type, which has a steering handle 21 with a cross piece 22. The handle is movable to a forwardly extending position and swingable laterally for turning the steering wheel or wheels 23 of the truck. The steering handle 21 is brought to a position extending over the pilot unit 10 centrally thereof, so that its forward end is disposed above the forward end of the unit, and has the forward portion of the handle secured as by screw clamp members 24 engaging the opposite ends of the cross piece 22 and supported on a pair of uprights 25 extending upwardly from the platform at each side thereof. A cross bar 26 connected between the uprights bears against the under surface to assure rigid securement. The handle 21 is also attached to the unit 10 at a point rearwardly of its securement to the uprights 25. The handle is attached by a clevis-like bracket 27 having a U-shaped or yoke portion 28 engageable about the truck handle 21, a removable pin or bolt 29 extending across the open end of the yoke to overlie the handle, with another pin or like member 30 extending transversely of the yoke 28 to engage the lower surface of the handle. A shaft or shank 31 extends from the closed end of the yoke 28 past the rear end of the platform 11, for adjustable securement thereto by any suitable means such as a collar 32 or other suitably apertured means secured to the platform and receiving the shank 31 therethrough, a set screw (not shown) or other suitable means being employed to hold the shank in adjusted position relative to the collar. It will be evident that by the means described, the steering handle 21 of the truck 20 is substantially fixed to the unit 10 so that as the unit turns to one side or the other the handle 21 turns in the same direction, thus through the wheel or wheels 23 steering the truck 20 in response to the movement of the pilot unit. It will be apparent that the handle of the steered or guided vehicle may be connected to the rear portion of the platform, instead of being disposed over the pilot unit, in such fashion as to be turned by the pilot unit as the unit is turned in one direction or the other, the handle extending substantially horizontally between the guided vehicle and the pilot unit 10. If the steering handle is relatively long, however, the guided vehicle would not follow the path of the pilot unit as closely as if the distance between the vehicle and unit were shorter than the length of the handle, since the steering wheel or wheels 23 of the truck 20 or other guided vehicle would not be turned as sharply or abruptly as the wheel 12 of the pilot unit. Under some circumstances, this might result in difficulties because of restricted aisles or passageways available for movement of the vehicle. In such cases, the closer coupling provided by the illustrated securement of the steering handle would of course be preferable. It should be understood that the pilot unit may be used to guide or steer vehicles provided with steering means other than a steering handle such as the handle 21, it being necessary in such event merely to provide suitable means adapted to connect the unit to the steering mechanism in such manner as to operate the same for directional turning of the vehicle in accordance with turning of the pilot unit, or in other words for steering movement. It will be apparent from FIGS. 1 and 2 that the securement of the handle as illustrated serves not only to connect the handle to the pilot unit in steerable relation, but serves also to support the unit 10 in upright position, borne on the single wheel 12. Additional wheels for the pilot unit are thus made unnecessary, although of course they may be provided if desired.

A storage battery 33 is shown as carried on the platform 11 to supply the power for driving the motor 18, and also for energizing the motor control circuit, but it will be understood that the battery might be replaced by suitable electrical connecting means supplying power from the power means of the truck 20. The battery or other electrical supply means is connected to the motor 18 through a motor control unit 34 which may include a manually operable switch 35 for disconnecting the motor from the battery. The steering motor control 34 is shown in this instance as mounted on the handle 21 of the truck 20 by means of straps 36 and bolts 37, although it will be understood that it may be elsewhere and otherwise mounted.

A control circuit for the steering motor 18 is diagrammatically shown in FIG. 5, employing means for sensing a vehicle path or course as disclosed in the De Liban Patent 3,009,525, issued November 21, 1961, for "Guidance System." While any of the steering control arrangements of this patent, or steering controls of this general type not disclosed in the patent, may be employed, the pilot unit 10 of this invention is disclosed by way of example as incorporating a circuit similar to that shown in FIG. 10 of that patent and described in the corresponding portions of the patent specification. More specifically, the circuit comprises a sensing coil structure generally indicated at 38, including a pair of coils 38a and 38b (FIG. 5) which are mounted forwardly of the wheel 12 by means of a bracket 39 secured to the wheel swivel yoke 13. The coils are thus located and adapted to sense a signal emitted by a guidance conductor 40 which is disposed below the surface over which travel the pilot unit 10 and the vehicle it steers, as will be evident from FIGS. 1 and 2. One of the sensing coils 38a is the source of a reference signal, and has one end connected to the input terminal of a reference signal amplifier 41a. The other coil 38b emits an error signal if the unit 10 deviates from the path defined by the conductor 40, and has one end connected to the input of an error signal amplifier 41b. Both amplifiers are disposed in an amplifier housing 41 carried on the platform 11 of the unit. The other ends of the coils are connected to a point of reference potential, such as ground. The output terminals of the amplifiers are connected to the input terminals of a phase detector 42, in this case shown as mounted on the housing of the motor 18, the phase detector in turn being connected to the steering motor control 34, which as already explained is connected to the steering motor 18. The motor is mechanically connected to the swivel shaft 14 of the wheel 12 for directional turning or steering thereof as already explained. In operation, the pilot unit 10 follows the path defined by the conductor 40, the motor 18 being actuated in one or the other direction in response to any deviation of the wheel 12 from the path or course indicated by the conductor signal, or in response to the turns or bends in the path, the wheel otherwise being disposed in its straight-ahead position as shown in FIGS. 1 and 2, to follow the straight portions of the path. The truck 20 or other vehicle follows the pilot unit by reason of the connection of the steering member, such as the handle 21, to the unit, as explained hereinabove.

In FIGS. 3 and 4, there is illustrated a pilot unit generally designated 50, employed with manually operated or non-powered vehicles. This unit is similar to the pilot unit 10, differing mainly in the provision of driving means for the caster wheel and the use of a specifically different wheel. In the pilot unit 50, the platform 11 is supported by a wheel 51 having a wide tread which may be provided by a pneumatic tire or the like, so that a relatively soft and wide wheel surface engages the floor or ground surface on which the vehicle travels, thus providing for good traction and allowing the unit to serve as a tractor for a considerable load. An electric drive motor 52 is provided to drive the caster wheel 51 through gearing or other suitable drive connection means extending between the motor and wheel within a housing 53 secured to the motor housing and depending therefrom. The wheel 51 is rotatably supported by a stub shaft (not shown) projecting horizontally from the lower portion of the housing. The wheel and drive housing are rotatable about a vertical axis as a unit by the motor 52 through a transmission 54 of known construction and application in the industrial truck art. The wheel 51 is disposed below, and the drive motor 52 above, the platform 11 with the drive housing 53 projecting perpendicularly through the plane of the platform, which may be suitably apertured or cut away for the purpose. A gear 55 fixed relative to the housing 53 is rotatable on the swivel axis of the caster wheel 51 and about the transmission 54, and is engaged with the gear 17 of the steering motor 18. The gear 17, as previously explained, is the last of a train of reduction gears driven by the motor 18, and is disposed on the lower end of the motor shaft.

When the parts are in the relation illustrated in FIGS. 3 and 4, the pilot unit 50 will be moved in a straight line by the caster wheel 51, driven by the motor 52 to provide tractive power. When the steering motor 18 is actuated in either direction, the gear 17 is rotated to drive the gear 55, thereby to turn the caster wheel 51 in one direction or the other about the vertical swivel axis, the housing 53 being turned with the wheel to continue the driving thereof. The pilot unit 50 of course moves in the direction in which the wheel is headed. The motors 18 and 52 are energized by a storage battery 58 carried on the unit, which also serves to energize the control circuit.

The control circuit for the pilot unit 50 is substantially the same as that for the unit 10, including a steering motor control 34 mounted on the unit, as on the plateform 11. The steering motor control 34 may include the switch 35 for the steering motor 18, and may also have a suitable switch 59 for electrically connecting and disconnecting the drive motor 52 and battery 58. The steering motor control 34 is connected to the motor 18 for driving the same in one or the other direction, as in the case of the pilot unit 10, in accordance with the output of the signal-sensing arrangement, which includes the coils 38a and 38b of the sensing coil structure 38. In the case of the unit 50, the sensing coil structure 38 is carried forwardly of the wheel 51 by means of a bracket 60 secured to the driving housing 53, as shown for example in FIGS. 3 and 4. The reference coil 38a and the other coil 38b are each connected at one end to a point of reference potential, such as ground. The output of coil 38a is connected to the input of the reference signal amplifier 41a, and the output of coil 38b is connected to the input terminal of the error signal amplifier 41b, both amplifiers being disposed in the amplifier box or housing 41 as previously described. The output terminals of the amplifiers 41a and 41b are connected to the input terminals of the phase detector 42, the output of which is connected to the steering motor control 34. The control 34, as already explained, regulates the driving of the steering motor 18, and thus the directional turning or steering of the wheel 51, through the mechanical coupling or connection of the motor 18 to the swiveled drive housing 53, in this case by means of the gears 17 and 55. The pilot unit is thus maintained on the course or path defined by the conductor 40, in the same manner as the unit 10.

A self-driven or powered pilot unit 50 is employed to pull and guide a non-powered vehicle, such as the hand-operated truck generally designated 61, by means of the steering T-handle 62 of the truck, which may be pivoted to swing from side to side of the truck to steer the same by means of the wheels 63 at the forward end thereof. The handle is swung forwardly to extend over the pilot unit 50, and has a crosspiece 64 which is secured to uprights 65 extending from the platfrom 11. The securement of the handle crosspiece 64 may be made in any suitable manner, as by means of opposed projections 66 on the uprights, each with a coupling sleeve 67 or the like threadedly mounted thereon and receiving an end of the crosspiece. The handle 62 of the truck is also secured to the rear portion of the platform 11, suitably by the clevis-like bracket 27 employed with the truck 20 and pilot unit 10, and described in connection with FIG. 1. The handle 62 of the truck 61 is thus secured to the pilot unit 50 to follow its movements and thereby steer the truck 61 to follow the unit, in the same manner as described hereinabove in connection with the pilot unit 10 and truck 20. The truck 61, however, is drawn by the unit 50 instead of pushing the unit, as is the case with the truck 20 and unit 10. As with the arrangement shown in FIGS. 1 and 2, the securement of the handle 62 of truck 61 to the pilot unit 50 provides for steadying and stabilizing the unit and holding it in upright position, so that only the single wheel 51 need be provided for the pilot unit. It will be evident that the truck 20 may draw a number of other trucks or like vehicles, and that the truck 61 may similarly be the first of a train of vehicles drawn by the pilot unit 50.

The invention is not limited in its application to the type of guidance system in which a signal is emitted by a conductor or the like for sensing by a plurality of coils which provide a directional or steering response of a vehicle to the signal, but may be employed for vehicles used in guidance systems of any desired kind. In FIGS. 6 to 8 inclusive, there is illustrated a novel guidance system employing magnetic means for controlling the path followed by the vehicles, and a pilot unit is illustrated employing the principle of the unit as disclosed in connection with the embodiments of FIGS. 1 to 5 inclusive, in a form adapted to a vehicle guidance system in which magnetic means replace the relatively complicated signal-emitting and sensing means of a conventional system such as that disclosed in FIGS. 1 to 5.

The pilot unit, generally designated 70, is shown in FIGS. 6 to 8 as comprising a strong permanent magnet 71 of horseshoe shape which is supported by a caster wheel 72 in a predetermined substantially fixedly spaced relation above means of magnetic material 73 defining the path or course which a vehicle (not shown) employed in the system is to follow. In the present instance, the course-defining means is disclosed as a series of plates or strips of mild steel or other suitable magnetic material, laid generally end-to-end on a floor or the ground in the pattern of travel desired for the vehicle, and the caster wheel 72 bears on the plates and travels thereover. A mounting bracket 74, best shown in FIGS. 7 and 8, comprising a strap or bar of suitable material bent to a form providing a downward offset 75 snugly receiving the central portion of the horseshoe magnet 71 and a downwardly extending leg portion 76 on the lower end of which the caster wheel 72 is swiveled, is secured as by a pair of U-shaped clamps 77 tightened by bolts 78 onto the steering handle 80 of the vehicle which is to be guided along the course. The clamps 77 may have their central portions secured as by rivets, welds, or the like to flat portions of the bracket 74, one between the caster-supporting leg portion 76 and the offset 75, and the other at the other side or end of the offset. The caster wheel is disposed forwardly of the magnet, which is secured transversely of the steering handle 80 with its pole ends down and spaced slightly from the plates 73.

Of course, other means might be provided for securing the unit 70 to the vehicle steering handle if desired, and the caster wheel might be replaced by a support rod or the like adapted to ride relatively smoothly over the plates. It will be appreciated that the plates 73 or other course-defining means of magnetic material may be disposed flush with or below the surface over which the vehicle travels, and may even be a beam or like structural element of the building in which the vehicle is used. It should also be understood that the guide plates 73 or like course-defining means might be disposed overhead, or on a wall or partition along which the vehicle was to travel, or be mounted, like a rail. Of course, more than one magnet may be employed if desired, as in a tandem arrangement, and the magnet shape may be varied. It will also be understood that an electromagnet might be used instead of a permanent magnet, and the term "magnet" as used herein is intended to include both permanent magnets and electromagnets. An electromagnet, of course, is mounted with the axis of the coil perpendicular to the course-defining means. If an electromagnet is employed, suitable energizing means therefor are provided in any convenient manner, as will be understood.

In operation, as the vehicle moves along the path or course defined by the magnetic material means 73, the magnet 71 and plates or the like 73 are magnetically coupled by the attraction therebetween, a path of low reluctance for the magnetic flux being provided between the poles of the magnet by the material of the plates and the air gaps between the poles and the plates. The magnet therefore is held over the course-defining plates, and resists any movement laterally beyond the edges of the plates. Thus when the vehicle is moved forwardly, the magnet 71 follows along the length of the path defined by the plates 73, and the steering handle of the vehicle follows the movements of the magnet relative to the plates. When the magnet comes to a bend or turn in the path or course, such bend being defined by disposition of the plates or other means of magnetic material at an angle or along a curve relative to the preceding portion of the course-defining means, the magnet follows the plates along such angle or curve. The steering handle 80 turns in accordance with the movement of the magnet from its previous line of movement or progress, and thus causes the vehicle to turn correspondingly and follow the bend or turn in the course. The caster wheel 72 of course moves readily in any direction that the magnet 71 may take as a result of following the plates 73, so that it does not interfere with free movement of the magnet and steering handle.

In addition to supporting the magnet and handle in such position that the poles of the magnet are held in a predetermined spaced relation to the plates, the caster wheel rides easily over any slight irregularities in the surface provided by the plates or other means of permeable material employed to define the course to be followed by the vehicle, or over the surface of the floor or ground on which the vehicle travels, and thus raises and lowers the magnet so that it does not become snagged on obstructions which may lie in its path. The support of the magnet in spaced relation above the course-defining means by the caster wheel also prevents the magnet from engaging with the plates or floor due to rocking of the vehicle from side to side in traveling over an uneven floor or similar surface. It will be understood that when the plates 73 or similar means are disposed on or flush with the floor or other surface which the vehicle travels, the caster wheel 72 engages on the course-defining means, while if the plates are disposed below such surface, the wheel bears on the surface over the plates or similar means. If the course-defining means 73 were disposed otherwise than below the plane of the vehicle to be guided, as for example in a raised overhead position, the securement between the pilot unit and the steering handle or other steering means of the vehicle could of course be accomplished by conventional means in a fashion assuring that the handle would follow the lateral movements of the magnet.

In FIG. 9, there is illustrated a modification of the pilot unit of FIGS. 6 to 8. As will be obvious from a comparison of these views, the pilot unit of FIG. 9, generally indicated as 90, differs from the unit 70 primarily in that the horseshoe-shaped permanent magnet 91 is mounted longitudinally rather than transversely of the vehicle steering handle. The magnet 91 is secured to the steering handle 92 of the vehicle to be guided in any suitable manner as by a U-clamp 93 the central portion of which underlies the central portion of the magnet and the arms of which project upwardly above the handle, on either side thereof, and are bolted or otherwise secured together. A mounting bracket 94 is provided for securing the caster wheel 95 on the steering handle 92. The bracket 94 includes a U-shaped clamping portion 96 similar to the clamp 93, and a downwardly extending leg portion 97 which may be integral with or fastened to the clamp portion 96 in any desired manner. The caster wheel 95 is swiveled in the lower end of the leg portion 97 in any convenient manner.

The two portions of unit 90 comprising the magnet and wheel may be connected to each other unitarily by bars or straps extending between the clamping or securing means, and serving to space the caster wheel and magnet a predetermined distance apart, as indicated in dotted lines at 98. Regardless of whether such a connection is made between the two portions of the unit, it will be obvious that they constitute a single pilot unit and control the steering of the vehicle in the same manner as explained in connection with the pilot unit 70. In at least some instances, it may be desirable and feasible to dispose the caster wheel centrally below the magnet, rather than forwardly thereof. This may readily be accomplished by employing the mounting bracket 94, somewhat modified in its dimensions, in place of the U-clamp 93 to secure the magnet 91 and at the same time dispose the caster wheel in the desired position, or the clamp 93 might be formed with a central downward offset providing for swiveling of the caster wheel thereon. In any case, regardless of the particular manner of mounting or location of the caster wheel, it is arranged to support the magnet in substantially fixedly spaced relation to the course-defining means as in the case of the unit 70 illustrated in FIGS. 6 to 8.

As already indicated, the operation of the pilot unit 90 is substantially the same as that of the unit 70, the magnet 91 resisting lateral movement thereof off or beyond the course-defining means 73, and in following the direction determined by such means effecting movement of the steering handle causing the vehicle to follow the course laid out by the plates 73 or other means employed for the purpose.

The magnet guidance system and the pilot unit are not limited to use with vehicles having steering handles movable to a forwardly extending position, since as hereinbefore already pointed out the vehicle may have other types of steering means, and conventional means may be provided for connecting the steering means to the pilot unit to effect steering of the vehicle in response to movements of the unit. In particular, it may be pointed out that the magnet guidance system and pilot unit lend themselves to use with substantially any type of industrial truck, including the tractor type designed primarily to draw one or more "passive" vehicles, or unpowered trucks, adapted to transport loads of various types. Such tractors often have operating means, including steering controls, operable only from a driver's or operator's station on the tractor. To adapt such tractors to use with the pilot unit in a magnet guidance system, it is only necessary to provide a tongue fixed to the axle of the steering wheel or wheels and projecting forwardly, in such manner that lateral movement of the tongue causes directional turning of the steering wheels. The pilot unit may then be secured to this tongue in the same manner as disclosed in connection with the vehicle steering handle, and operate to effect steering of the tractor in the manner already explained. It will be understood that if desired, a driving motor may be employed for the caster wheel so that the pilot unit will serve to draw the vehicle as well as guide it, in the manner described in connection with the pilot unit 50 of FIGS. 3 and 4.

It has heretofore been considered necessary that guidance systems for vehicles be of relatively complicated design and construction, involving electronic components and circuits, in order to assure safe, positive, and efficient operation in guiding industrial trucks and similar vehicles along predetermined paths. The hereinabove disclosed magnetic system eliminates such elaborate arrangements, and provides a very simple yet completely effective and easily installed system instead. If the mild steel plates 73 or other course-defining means are of substantial weight, it is only necessary to lay them upon the surface over which the vehicle travels, or flush therewith, if desired, but if such means are relatively thin or lightweight, anchoring thereof is preferable to avoid any possibility of their being drawn out of position by the magnet on the vehicle, instead of holding the vehicle to the desired course. Tests made with plates of mild steel some ⅜″ thick and 6″ wide have demonstrated that the system will operate effectively and positively to guide vehicles representing heavy loads along the desired course without appreciable deviation therefrom at speeds in excess of those normally employed in the use of industrial trucks or the like. The system has been found to be very reliable, and in fact might even be said to be as reliable as gravity, despite its simplicity. In addition to its effectiveness and reliability, the system has the advantage of being inexpensive, and particularly so in comparison with the electronic guidance systems which have heretofore been considered necessary.

The system also allows the advantages of pushing a load or train of trucks as against pulling the same to be realized, since it is not necessary that the vehicle moving the load or train be in the lead in order to steer, the pilot unit being merely applied to the first vehicle of the train. Pushing of a load on a vehicle may be done manually, if desired, without any danger of the vehicle straying from the desired course. A train of trucks or cars adapted for use in the system of the invention may be assembled and moved along the course without any need for coupling them together, since each will travel the prescribed path individually, one after the other, without guidance from the preceding one. The time and labor required for coupling and uncoupling the trucks or other vehicles are thus eliminated. Passive trucks and hand trucks may therefore be made up into trains and separated as may be desired, without difficulty and with only little labor, to be employed in accordance with particular conditions. Hand trucks equipped for use in the system are steered automatically, and the operator is thus relieved of any need to guide the vehicle; in fact, manual steering should be avoided.

The essentials for the magnetic system disclosed comprise merely a passive or course-defining element on or in the floor, and a field generating device or magnet, with a low-reluctance path providing for good magnetic coupling therebetween. The magnetic guidance system requires no electrical power, thus eliminating any need for batteries or other electrical source on or off the vehicle, as will be obvious. Of course, if an electromagnet is employed rather than a permanent magnet, sufficient electric power must be provided to energize the coil, which can readily be accomplished in a number of ways. The course-defining means or passive element of the system, not being employed as a conductor of electricity so as to generate or emit a signal for sensing by appropriate means on the vehicle, is not subject to short circuiting which might damage not only the passive element but also the field generating device or magnet, as well as the truck or other vehicle employed in the system. The danger of injuring workers due to shorting or other malfunctioning of the electrical circuit is of course not present in the magnetic system illustrated and described herein. Furthermore, failure of electrical power supply for any reason does not disable the system or require emergency equipment, as is the case with previous guidance systems, since the permanent magnet is not dependent upon electricity for its functioning, and an electromagnet does not need to be energized from the source to which the signal-generating conductor is connected.

The invention is not limited to the particular embodiment and application thereof illustrated and described, which are exemplary only, since many modifications and variations thereof, some of which have been pointed out hereinabove, may be made without departing from the inventive concept. Accordingly, it is not intended to limit the invention otherwise than as may be required by the appended claims.

I claim:

1. For use with a vehicle having ground engaging steering wheel means and a forwardly extending steering element, that is long relative to the width of the vehicle track, a pilot device disposed forwardly of the vehicle for steering the vehicle along course-defining means, comprising a swivel caster wheel with the horizontal axis of rotation being offset from the vertical pivotal axis, direction control means supported by the caster wheel in spaced relation relative to said course-defining means, said direction control means being responsive to said course-defining means to effect positioning of the caster wheel relative to the defined course for maintaining the caster wheel on the course, and means for securing the steering element of the vehicle to said device for response to directional movements of said caster wheel.

2. A pilot device for steering along course-defining means a vehicle having a main frame and a forwardly extending steering lever arm that is long relative to the width of the vehicle track, comprising a swivel caster wheel with the horizontal axis of rotation being offset from the vertical pivotal axis, direction control means supported by the wheel in spaced relation relative to said course-defining means for sensing said course-defining means and effecting positioning of the wheel relative to the defined course to maintain the wheel on the course, and means for connecting the steering lever arm of said vehicle to said device forwardly of the main frame for response to directional movements of the wheel.

3. A pilot device for steering along course-defining means a vehicle having a main frame and steering means, comprising: a caster wheel; direction control means supported by the wheel for sensing said course-defining means and effecting positioning of the wheel relative to the defined course to maintain the wheel on the course; said direction control means being comprised of electrical supply means carried by the device, a steering motor on the device connected to said supply means, means connecting the motor to the caster wheel for directional turning thereof, and means on the device to actuate the steering motor in response to the position of the wheel relative to the defined course to maintain the wheel on the course; and means for connecting the steering means of said vehicle to said device forwardly of the main frame for response to directional movements of the wheel.

4. A pilot device substantially as defined in claim 2, wherein said course-defining means comprise means of magnetic material, and said direction control means comprises a magnet in magnetically coupled relation with the magnetic material means, said magnet being held in substantially fixedly spaced relation to the magnetic material means by said wheel.

5. A pilot device for steering along a signal-defined course a vehicle having a steering handle, comprising a caster wheel, means for securing the steering handle of said vehicle to said device forwardly of the vehicle for following movements of the device, electrical supply means carried by the device, a reversible electric steering motor on the device connected to said supply means for energization thereby, means drivingly connecting said motor to the caster wheel for directional turning thereof, and direction control means supported by the wheel to actuate said motor in response to the position of the wheel relative to said course to maintain the wheel on the course.

6. A pilot device for steering along a signal-defined course a vehicle having steering means, comprising a caster wheel supporting the device forwardly of the vehicle, means for connecting the vehicle steering means to the device for response to changes in direction thereof, an electric steering motor, means providing a drive connection between said motor and wheel for directional turning of the wheel, electrical supply means connected to the motor for actuation thereof, and steering control means in the device for sensing the course signal and actuating the motor in response thereto to maintain the wheel on said course for steering the vehicle along the course.

7. A pilot device for steering along a course defined by a strip of magnetic material a vehicle having a forwardly extending steering handle that is long relative to the vehicle track, comprising a swivel caster wheel with the horizontal axis of rotation being offset from the vertical pivotal axis, a magnet supported by said wheel in substantially fixedly spaced relation to said strip of magnetic material for magnetic coupling therebetween holding the wheel against deviation from said course, and means for securing the device to the steering handle forwardly of the vehicle for movement thereof corresponding to directional movement of the wheel.

8. The pilot device of claim 7 wherein said magnet is disposed with opposite poles spaced apart transversely of said strip of magnetic material adjacent the opposite edges thereof.

9. A vehicle guidance system comprising a path defined by a strip of magnetic material, a vehicle having steering means including a forwardly projecting steering lever arm that is long relative to the width of the vehicle track, a magnet secured on said projecting steering lever arm forwardly of the vehicle, a swivel caster wheel with the horizontal axis of rotation being offset from the vertical pivotal axis disposed forwardly of the magnet, and means securing the projecting steering lever arm to the wheel for following movement thereof, said wheel maintaining the magnet in substantially fixedly spaced relation to the strip of magnetic material for magnetic coupling therebetween to hold the wheel against deviation from the path.

References Cited by the Examiner

UNITED STATES PATENTS

| | | | |
|---|---|---|---|
| 933,914 | 9/1909 | Neville | 104—247 |
| 1,124,273 | 1/1915 | Bernheim | 104—148 X |
| 2,068,403 | 1/1937 | Ekstrom. | |
| 2,493,755 | 1/1950 | Ferrill | 180—82.1 |
| 2,691,946 | 10/1954 | Marmo | 180—79.1 X |
| 2,847,077 | 8/1958 | Vaughan | 180—79.1 |
| 2,903,821 | 9/1959 | Favre | 180—79 X |
| 2,978,053 | 4/1961 | Schmidt | 180—79.1 X |
| 3,009,525 | 11/1961 | De Liban | 180—82 |

FOREIGN PATENTS

| | | |
|---|---|---|
| 102,385 | 3/1917 | Great Britain. |
| 708,187 | 4/1954 | Great Britain. |
| 784,805 | 10/1957 | Great Britain. |

BENJAMIN HERSH, *Primary Examiner.*

A. HARRY LEVY, *Examiner.*